United States Patent
Fan et al.

(10) Patent No.: US 10,465,041 B2
(45) Date of Patent: Nov. 5, 2019

(54) MODIFIED POLYESTER AND ITS PREPARATION METHOD

(71) Applicant: JIANGSU HENGLI CHEMICAL FIBRE CO., LTD., Wujiang (CN)

(72) Inventors: Hongwei Fan, Wujiang (CN); Zhili Liu, Wujiang (CN); Wengang Li, Wujiang (CN); Fangming Tang, Wujiang (CN); Lili Wang, Wujiang (CN); Lixin Yin, Wujiang (CN)

(73) Assignee: JIANGSU HENGLI CHEMICAL FIBRE CO., LTD., Wujiang (CN)

( * ) Notice: Subject to any disclaimer, the term of this patent is extended or adjusted under 35 U.S.C. 154(b) by 0 days.

(21) Appl. No.: 16/322,948

(22) PCT Filed: Jun. 26, 2017

(86) PCT No.: PCT/CN2017/089943
§ 371 (c)(1),
(2) Date: Feb. 3, 2019

(87) PCT Pub. No.: WO2018/040688
PCT Pub. Date: Mar. 8, 2018

(65) Prior Publication Data
US 2019/0169361 A1 Jun. 6, 2019

(30) Foreign Application Priority Data
Aug. 31, 2016 (CN) ............ 2016 1 0770150

(51) Int. Cl.
*C08G 63/81* (2006.01)
*C08G 63/183* (2006.01)
*D01F 6/62* (2006.01)
*D06P 3/54* (2006.01)

(52) U.S. Cl.
CPC ............ *C08G 63/183* (2013.01); *C08G 63/81* (2013.01); *D01F 6/62* (2013.01); *D06P 3/54* (2013.01)

(58) Field of Classification Search
USPC ....................................... 528/308.3
See application file for complete search history.

(56) References Cited

FOREIGN PATENT DOCUMENTS

| CN | 101817917 A | 9/2010 |
|----|-------------|--------|
| CN | 102020761 A | 4/2011 |
| CN | 102030893 A | 4/2011 |
| CN | 106380580 A | 2/2017 |
| JP | 2014189933 A | 10/2014 |
| WO | 2012027885 A1 | 3/2012 |

*Primary Examiner* — Terressa Boykin
(74) *Attorney, Agent, or Firm* — Gokalp Bayramoglu

(57) ABSTRACT

A method for preparing the modified polyester. The modified polyester segments include terephthalic acid segment, ethylene glycol diol segment and branched diol segment, in which the branched diol segment refers to a diol segment in which a branch is located on a non-terminal carbon in the glycol segment and the branch is a linear carbon chain having 5 to 10 carbon atoms. The method includes preparing terephthalic acid glycol ester through the esterification of terephthalic acid and branched diol using the concentrated sulfuric acid as the catalyst. Then get ethylene terephthalate through the esterification of terephthalic acid and ethylene glycol. After stirring and mixing the two, the modified polyester can be obtained through polycondensation reaction of a low vacuum stage and a high vacuum stage using the catalyst and stabilizer.

12 Claims, No Drawings

MODIFIED POLYESTER AND ITS PREPARATION METHOD

CROSS REFERENCE TO THE RELATED APPLICATIONS

This application is the national phase entry of International Application No. PCT/CN2017/089943, filed on Jun. 26, 2017, which claims priority from the Chinese patent application no. 201610770150.X filed on Aug. 31, 2016, the entire contents of which are incorporated herein by reference.

TECHNICAL FIELD

The invention belongs to the technical field of polyester, and involves a modified polyester and its preparation method.

BACKGROUND

Polyethylene terephthalate (PET fiber or polyester fiber) fiber has high breaking strength and elastic modulus, moderate resilience, excellent heat setting, good heat and light resistance, acid and alkali resistance and corrosion resistance since its inception. A series of excellent properties such as sex, and the fabric has the advantages of anti-wrinkle and capital-free, good rigidity, and is widely used in clothing, home textile and other fields.

However, due to the high crystallinity of PET, the structure is dense, and there is no functional group bonded to the dye on the molecular chain, so that the dye molecules are difficult to enter the fiber interior, and dyeing is difficult. It cannot meet the demand for bright, beautiful fabrics.

The reason why PET dyeing is difficult is that PET is a symmetrical linear macromolecule. The molecular chain does not contain a side chain group. The regularity is very good. Its main chain contains a rigid benzene ring and a flexible hydrocarbon group, and directly with the benzene ring. The linked ester group and the benzene ring form a rigid conjugated system, which restricts the free rotation of the flexible segment. This structure increases the wall ridge of the movement of the molecular segment, resulting in a higher glass transition temperature of PET, which needs to promote the diffusion of dye molecules into the fiber inside under high temperature conditions, and complete the dyeing step. In addition, PET has a regular molecular chain, good crystallinity, tight molecular chain arrangement, and no polar groups on the molecular chain that interact with dye molecules, making PET fiber coloring more difficult.

Therefore, the dyeing of the usual PET fiber is generally selected under the high temperature and high pressure, and the disperse dye is selected. When the temperature reaches the glass transition temperature of the PET fiber, the degree of free volume increase is small, the dyeing rate is not high, and the dyeing property is poor. Therefore, the energy consumption and low dye uptake caused by the high temperature and high-pressure method are the main problems now facing. In addition, PET fibers have a high melt viscosity, which is not conducive to processing.

SUMMARY

The present invention is to provide a modified polyester and its preparation method that can make up for the deficiencies of the prior art. The present invention introduces a branched diol segment into a molecular chain of a modified polyester. Under the circumstance, the increase of the spatial gap between the molecular chains of the modified polyester is far greater than that of the unbranched polyester at the same temperature, which is beneficial for the fine particles such as the dye entering the modified polyester and improving the modification. The dyeing rate of modified polyester fiber can also be raised. The melt viscosity of modified polyester relative to unbranched polyester can also be reduced, which is helpful to reduce processing temperature, reduce degradation rate and facilitate processing. The branched diol segment does not cause much damage to the structural regularity of the modified polyester, maintaining the excellent performances of the polyester.

A modified polyester is comprised of a terephthalic acid segment, an ethylene glycol segment, and a branched diol segment. The branched diol segment means that the branched chain is located on a non-terminal carbon in the diol segment and is branched into a diol segment having a linear carbon chain of 5 to 10 carbon atoms.

As a preferred technical solution:

A modified polyester as described above, wherein the modified polyester has a spatial gap between internal molecular chains which increases 10 to 30 v/v % at a temperature of 80 to 130° C., and melt viscosity decreases by 10-20% at 260 to 290° C.

The increase of the spatial gap between the molecular chains refers to the comparison of the spatial gap between the modified polyester and the conventional polyester at the same temperature.

The decrease in melt viscosity refers to the comparison of the melt viscosity of the modified polyester and the conventional polyester at the same temperature.

A modified polyester as described above, in which the branched diol segment is one or more items selected from the group consisting of a 2-pentyl-1,3 propanediol segment, a 2-hexyl-1,3 propanediol segment, a 2-heptyl-1,3 propanediol segment, a 2-octyl-1,3 propanediol segment, a 2-mercapto-1,3 propanediol segment, a 2-mercapto group-1,3 propanediol segment, a 2-pentyl-1,4 butanediol segment, a 2-hexyl-1,4 butanediol segment, a 2-heptyl-1,4 butanediol segment, a 2-octyl-1,4 butanediol segment, a 2-mercapto-1,4 butanediol segment, a 2-mercapto-1,4 butanediol segment, a 2-pentyl-1,5 pentanediol segment, a 2-hexyl-1,5-pentanediol segment, a 2-heptyl-1,5-pentanediol segment, a 2-octyl-1,5-pentanediol segment, a 2-mercapto group-1,5 pentanediol glycol segment, a 2-mercapto-1,5 pentanediol segment, a 2-pentyl-1,6 hexanediol segment, a 2-hexyl-1,6 hexanediol segment, a 2-heptyl-1,6-hexanediol segment, a 2-octyl-1,6-hexanediol segment, a 2-mercapto-1,6-hexanediol segment and a 2-mercapto-1.6 hexanediol segment. The ratio of molar percentage of the branched diol segment to that of ethylene glycol segment ranges from 2 to 5%.

A modified polyester as described above, wherein the modified polyester has a number average molecular weight ranging from 15,000 to 30,000.

The preparing method of the modified polyester as described above, comprising the steps of:

(1) Preparation of Terephthalic Acid Glycol Ester:

Mix terephthalic acid and branched diol to slurry, and carry out the esterification reaction under the catalytic action of concentrated sulfuric acid to obtain a terephthalic acid glycol ester.

The branched chain diol segment is introduced into the long chain of the modified polyester macromolecule, and the length and the amount of the branch have a great influence on the crystallization property and flow behavior of the modified polyester, and the branch length is too short. For the purpose of polyester modification, the length being too long will cause new entanglement, affecting its flow behavior. When the branch is located on a non-end group carbon in the diol segment and the branch contains 5-10 when the linear carbon chain of carbon atoms is at a certain temperature, the increase of the space gap between the molecular chains of the modified polyester is far greater than that of the unbranched polyester at the same temperature, which is beneficial to the entry of fine particles such as dyes. The degree of internal modification of the polyester increases the dyeing rate, and at the same time, the viscosity of the modified polyester melt decreases, which can facilitate further processing.

(2) Preparation of Ethylene Terephthalate:

Mix the terephthalic acid and the ethylene glycol to slurry, carry out the esterification reaction to obtain ethylene terephthalate.

(3) Preparation of Modified Polyester:

After the esterification reaction in the step (2) is completed, add the terephthalic acid glycol ester prepared in the step (1), stir and mix, run the polycondensation reaction under the action of the catalyst and the stabilizer, and under the condition of the negative pressure. First in a low vacuum stage and then in a high vacuum stage to obtain a modified polyester.

The preparation method of the modified polyester as described above specifically includes the following steps:

(1) Preparation of Terephthalic Acid Glycol Ester:

Add the slurry of the terephthalic acid and the branched diol to the reactor, and carry out the esterification reaction under the catalytic action of concentrated sulfuric acid. The esterification reaction is carried out under a pressurized nitrogen environment, and the pressure is normal pressure to 0.3 MPa, and the temperature is 180-240° C. The reaction ends when the water distillation amount in the esterification reaction reaches 90% of the theoretical value or more than that. Then the terephthalic acid glycol ester is obtained.

(2) Preparation of Ethylene Terephthalate:

Add the slurry of the terephthalic acid and ethylene glycol into a reactor and then carry out the esterification reaction. The esterification reaction is carried out under a pressurized nitrogen environment, and the pressure is normal pressure to 0.3 MPa, and the temperature is 250-260° C. The reaction ends when the water distillation amount in the esterification reaction reaches 90% of the theoretical value or more than that. Then the ethylene terephthalate is obtained.

(3) Preparation of Modified Polyester:

After the end of the esterification reaction in the step (2), add the terephthalic acid glycol ester prepared in the step (1), stir and mix for 15-20 minutes under the action of the catalyst and the stabilizer, and a negative pressure. Carry out the polycondensation reaction under the condition of the low-vacuum stage, the pressure is smoothly pumped from normal pressure to an absolute pressure under 500 Pa, the temperature is controlled at 260~270° C., and the reaction time is 30~50 minutes. Then turn to high vacuum stage, the polycondensation reaction continues and the reaction pressure is reduced to an absolute pressure of less than 100 Pa, and the reaction temperature is controlled at 275 to 280° C., and the reaction time is 50 to 90 minutes in order to obtain a modified polyester.

The method for preparing a modified polyester in this invention, wherein in step (1), the molar ratio of terephthalic acid to the branched diol is 1:1.3-1.5. The concentrated sulfuric acid is added in an amount of 0.3-0.5% by weight of the terephthalic acid, and the concentration of the concentrated sulfuric acid is 50-60% wt.

The method for preparing a polyester fiber in this invention, wherein in step (2), the molar ratio of terephthalic acid to ethylene glycol is 1:1.2 to 2.0.

The method for preparing a polyester fiber in this invention, wherein in step (3), the molar percentage value of the terephthalic acid glycol ester and ethylene terephthalate is 2 to 5%. The catalyst is antimony trioxide, ethylene glycol or cerium acetate, and the amount of catalyst is an amount of 0.01% to 0.05% of the total weight of the terephthalic acid. The stabilizer is triphenyl phosphate, trimethyl phosphate or trimethyl phosphite, and the amount of stabilizer is an amount of 0.01% to 0.05% of the total weight of the terephthalic acid.

The method for preparing a modified polyester in this invention, wherein the branched diol is one or more items selected from the group consisting of a 2-pentyl-1,3 propanediol, a 2-hexyl-1,3 propanediol, a 2-heptyl-1,3 propanediol, a 2-octyl-1,3 propanediol, a 2-mercapto-1,3 propanediol, a 2-mercapto group-1,3 propanediol, a 2-pentyl-1,4 butanediol, a 2-hexyl-1,4 butanediol, a 2-heptyl-1,4 butanediol, a 2-octyl-1,4 butanediol, a 2-mercapto-1,4 butanediol, a 2-mercapto-1,4 butanediol, a 2-pentyl-1,5 pentanediol, a 2-hexyl-1,5-pentanediol, a 2-heptyl-1,5-pentanediol, a 2-octyl-1,5-pentanediol, a 2-mercapto group-1,5 pentanediol glycol, a 2-mercapto-1,5 pentanediol, a 2-pentyl-1,6 hexanediol segment, a 2-hexyl-1,6 hexanediol, a 2-heptyl-1,6-hexanediol, a 2-octyl-1,6-hexanediol, a 2-mercapto-1,6-hexanediol and a 2-mercapto-1,6 hexanediol.

The principle of the invention is:

For the unbranched polyester, the molecular chain structure is a linear macromolecule containing a benzene ring structure, the functional groups on the molecular chain are arranged neatly, the regularity is good, the flexibility is poor, and the free volume increase is small when the temperature is raised. These properties prevent the dye from entering the interior of the polyester and thus have poor dyeing properties.

The branch-containing diol segment contained in the modified polyester macromolecule of the present invention, when the temperature is higher than the glass transition temperature, the branch moves before the main chain, so that the increase of the free volume is far greater than that without the support. The characteristic of the polyester macromolecular chain of the chain, the increase of the free volume increases the degree of entry of the fine particles into the interior of the polyester. The free volume of the polyester fiber prepared by the modified polyester is much larger than that of the unbranched polyester at the same temperature. Fiber, which increases the degree of diffusion of the dye and improves the dyeing properties of the polyester fiber. At the same time, the polyester fiber prepared by the modified polyester is advantageous for lowering the melt viscosity and improving the processing property. The introduction of the branched diol segment does not cause much damage to the structural regularity of the polyester fiber, and maintains the excellent properties of the polyester fiber.

Beneficial Effects

The branch-containing diol segment contained in the modified polyester macromolecule obtained by the invention, when the temperature is higher than the glass transition temperature, the branch moves before the main chain, so that the increase of the free volume is far greater than that of no The characteristics of the branched polyester macromolecular chain, the increase of the free volume increases the degree of entry of the fine particles into the interior of the polyester, and the free volume of the polyester fiber is increased by the branch to increase the diffusion degree of the dye and improve the dyeing of the polyester fiber, performance.

The modified polyester obtained by the invention effectively reduces the melt viscosity and improves the processability.

The branched-chain diol segment of the modified polyester obtained by the present invention does not greatly deteriorate the structural regularity of the modified polyester, and maintains the excellent properties of the polyester.

DETAILED DESCRIPTION OF THE EMBODIMENTS

Hereinafter, the present invention will be described in more detail by the following examples. It should be noticed that these examples are only for illustrating the present invention and are not intended to limit the scope of the present invention. In addition, it should be noticed that after reading the content of the present invention, those skilled in this field can make various modifications or changes to the present invention, and these equivalent forms also apply to the scope of the appended claims of this application.

Example 1 to Example 28

A preparation method of a modified polyester, including the following steps:

(1) Preparation of Terephthalic Acid Glycol Esters:

Add the terephthalic acid and B at a molar ratio of A as a mixture into the reactor at a concentration of Cwt %, and the amount added is D % by weight of terephthalic acid. Under the catalysis of sulfuric acid, the esterification reaction is carried out. The esterification reaction is pressurized to E MPa under a nitrogen environment, the pressure is normal pressure, the temperature is F° C. The esterification reaction ends until the water distillation amount in the esterification reaction reaches G % of the theoretical value, and the terephthalic acid glycol ester is obtained.

(2) Preparation of Ethylene Terephthalate:

The terephthalic acid and ethylene glycol having a molar ratio of H are mixed into the reactor, and then the esterification reaction is carried out. The esterification reaction is pressurized to 1 MPa under a nitrogen environment, and a temperature of F° C. When the water distillation amount in the esterification reaction reaches K % of the theoretical value, the esterification reaction ends, and ethylene terephthalate is obtained:

(3) Preparation of Modified Polyester:

Add the terephthalate diol phthalate ester diol prepared in step(1) after completion of the esterification reaction in step(2). The molar percentage of terephthalate diol phthalate ester diol and ethylene glycol terephthalate is of L %. Stir and mix for M minutes. Add N % of O as catalyst in a total amount of terephthalic acid and P % of Q as stabilizer in a total amount of terephthalic acid. The polycondensation reaction in the low vacuum phase is started under the condition of negative pressure. The pressure is smoothly pumped from atmospheric pressure to an absolute pressure of R Pa, the temperature is controlled at S° C., and the reaction time is T minutes, then the vacuum is continued for the high vacuum phase. The polycondensation reaction is carried out to reduce the reaction pressure to an absolute pressure of U Pa, the reaction temperature is controlled at V° C., and the reaction time is W minutes. Then we can obtain the modified polyester.

The modified polyester obtained has a number average molecular weight of X and consists of terephthalic acid segment, ethylene glycol segment and branched B segment. The molar percentage of branched B segment and the ethylene glycol segment is Y %. At a temperature of Z° C., the interstitial space between the modified polyesters increased by ε v/v %. At ϑ ° C., the melt viscosity decreased by ϑ %.

The parameters of the variation in the different examples are shown in the following table. In the table, "BA" stands for 2-pentyl-1,3 propanediol, "BB" stands for 2-hexyl-1,3 propanediol, and "BC" stands for 2-Heptyl-1,3 propanediol, "BD" stands for 2-octyl-1,3 propanediol, "BE" stands for 2-mercapto-1,3 propanediol, and "BF" stands for 2-mercapto-1. 3 propylene glycol, "BG" stands for 2-pentyl-1,4 butanediol, "BH" stands for 2-hexyl-1,4 butanediol, and "BI" stands for 2-heptyl-1,4 The diol, "BJ" stands for 2-octyl-1,4 butanediol, "BK" stands for 2-mercapto-1,4 butanediol, and "BL" stands for 2-mercapto-1,4 Butanediol, "BM" stands for 2-pentyl-1,5-pentanediol, "BN" stands for 2-hexyl-1,5-pentanediol, and "BO" stands for 2-heptyl-1,5 Pentyl glycol, "BP" stands for 2-octyl-1,5 pentanediol, "BQ" stands for 2-mercapto-1,5 pentanediol, and "BR" stands for 2-mercapto-1. 5 pentanediol, "BS" represents 2-pentyl-1,6 hexanediol, "BT" represents 2-hexyl-1, 6 hexanediol, and "BU" represents 2-heptyl-1,6 hexanediol, "BV" stands for 2-octyl-1,6 hexanediol, "BW" stands for 2-mercapto-1,6-hexanediol, "BX" represents 2-mercapto-1, 6-hexanediol. "OA" stands for antimony trioxide, "OB" stands for ethylene glycol, and "OC" stands for Barium acetate, "QA" stands for triphenyl phosphate, "QB" stands for trimethyl phosphate, and "QC" stands for trimethyl phosphite, and the ratio is molar ratio.

TABLE 1

| | parameters of the variation in the different examples | | | | | | | | | | | | | | |
| --- | --- | --- | --- | --- | --- | --- | --- | --- | --- | --- | --- | --- | --- | --- | --- |
| EXAMPLE | A | B | C | D | E | F | G | H | I | J | K | L | M | N | O |
| 1 | 1:1.3 | BA | 50 | 0.3 | 0.1 | 180 | 90 | 1:1.2 | 0.1 | 250 | 90 | 2 | 15 | 0.01 | OA |
| 2 | 1:1.38 | BB | 55 | 0.32 | 0.13 | 181 | 91 | 1:1.3 | 0.12 | 251 | 91 | 2.1 | 16 | 0.011 | OA |
| 3 | 1:1.33 | BC | 60 | 0.33 | 0.12 | 183 | 92 | 1:1.31 | 0.31 | 252 | 92 | 2.2 | 16 | 0.03 | OA |
| 4 | 1:1.34 | BD | 55 | 0.34 | 0.13 | 184 | 93 | 1:1.32 | 0.33 | 253 | 93 | 2.3 | 17 | 0.033 | OA |
| 5 | 1:1.35 | BE | 55 | 0.36 | 0.14 | 185 | 93.2 | 1:1.33 | 0.14 | 254 | 93.2 | 2.4 | 17 | 0.034 | OA |
| 6 | 1:1.36 | BF | 55 | 0.37 | 0.15 | 186 | 93.3 | 1:1.34 | 0.15 | 255 | 93.3 | 2.5 | 18 | 0.035 | OA |
| 7 | 1:1.37 | BG | 50 | 0.38 | 0.16 | 187 | 93.4 | 1:1.36 | 0.16 | 256 | 93.4 | 2.6 | 19 | 0.036 | OA |

TABLE 1-continued parameters of the variation in the different examples

| | | | | | | | | | | | | | | | | |
|---|---|---|---|---|---|---|---|---|---|---|---|---|---|---|---|---|
| 8 | 1:1.38 | BH | 55 | 0.39 | 0.17 | 188 | 93.5 | 1:1.37 | 0.17 | 257 | 93.5 | 2.7 | 19 | 0.036 | OA |
| 9 | 1:1.39 | BI | 55 | 0.4 | 0.17 | 188 | 93.5 | 1:1.37 | 0.17 | 257 | 93.5 | 2.8 | 16 | 0.04 | OB |
| 10 | 1:1.4 | BJ | 55 | 0.4 | 0.17 | 188 | 93.5 | 1:1.38 | 0.18 | 257.8 | 93.6 | 3 | 17 | 0.03 | OB |
| 11 | 1:1.4 | BK | 60 | 0.4 | 0.18 | 189 | 93.6 | 1:1.39 | 0.19 | 258.8 | 94 | 4 | 18 | 0.04 | OB |
| 12 | 1:1.4 | BL | 55 | 0.4 | 0.2 | 200 | 92 | 1:1.6 | 0.2 | 256 | 92 | 4.5 | 18 | 0.038 | OC |
| 13 | 1:1.5 | BM | 60 | 0.5 | 0.3 | 240 | 92 | 1:2.0 | 0.3 | 260 | 92 | 5 | 20 | 0.05 | OC |
| 14 | 1:1.47 | BN | 55 | 0.47 | 0.28 | 220 | 92 | 1:1.8 | 0.27 | 258 | 92 | 4 | 18 | 0.04 | OB |
| 15 | 1:1.46 | BO | 55 | 0.49 | 0.28 | 233 | 92 | 1:1.8 | 0.28 | 259 | 92 | 4.5 | 19 | 0.044 | OA |
| 16 | 1:1.49 | BP | 55 | 0.48 | 0.28 | 230 | 92 | 1:1.8 | 0.28 | 258 | 92 | 4.7 | 19 | 0.048 | OB |
| 17 | 1:1.467 | BQ | 60 | 0.47 | 0.27 | 236 | 92 | 1:1.89 | 0.28 | 258 | 92 | 4.3 | 18 | 0.04 | OA |
| 18 | 1:1.48 | BR | 60 | 0.46 | 0.28 | 230 | 92 | 1:1.88 | 0.28 | 256 | 92 | 4.7 | 18 | 0.047 | OA |
| 19 | 1:1.46 | BS | 60 | 0.47 | 0.28 | 238 | 92 | 1:1.9 | 0.28 | 259 | 92 | 4.7 | 19 | 0.046 | OC |
| 20 | 1:1.46 | BT | 60 | 0.46 | 0.26 | 221 | 92 | 1:1.89 | 0.25 | 259 | 92 | 4.1 | 18 | 0.041 | OB |
| 21 | 1:1.43 | BU | 60 | 0.47 | 0.27 | 235 | 91 | 1:1.78 | 0.26 | 255 | 91 | 4.3 | 17 | 0.043 | OA |
| 22 | 1:1.43 | BV | 55 | 0.45 | 0.29 | 235 | 91 | 1:1.87 | 0.27 | 255 | 91 | 4.6 | 18 | 0.047 | OB |
| 23 | 1:1.457 | BW | 55 | 0.46 | 0.28 | 239 | 92 | 1:1.81 | 0.27 | 255 | 92 | 4.41 | 19 | 0.042 | OA |
| 24 | 1:1.47 | BX | 57 | 0.48 | 0.27 | 245 | 91 | 1:1.81 | 0.27 | 259 | 91 | 4.67 | 19 | 0.041 | OA |
| 25 | 1:1.45 | BW + BG (3:1) | 55 | 0.49 | 0.26 | 236 | 91 | 1:18 | 0.28 | 258 | 91 | 4.4 | 18 | 0.042 | OA |
| 26 | 1:1.45 | BO + BX (3:2) | 60 | 0.45 | 0.28 | 239 | 93 | 1:1.84 | 0.29 | 255 | 93 | 4.6 | 18 | 0.0423 | OA |
| 27 | 1:1.45 | BW + BG (3:1) | 55 | 0.49 | 0.26 | 236 | 91 | 1:1.8 | 0.28 | 258 | 91 | 4.4 | 18 | 0.042 | OA |
| 28 | 1:1.45 | BD + BG + BQ (3:2:1) | 55 | 0.47 | 0.29 | 235 | 92 | 1:1.8 | 0.27 | 258 | 92 | 4.71 | 18 | 0.04 | OA |

| EXAMPLE | P | Q | R | S | T | U | V | W | X | Y | Z | $\varepsilon$ | $\mathrm{g}$ | $\mathrm{\hbar}$ |
|---|---|---|---|---|---|---|---|---|---|---|---|---|---|---|
| 1 | 0.01 | QA | 500 | 260 | 30 | 100 | 275 | 50 | 15000 | 2 | 80 | 10 | 260 | 10 |
| 2 | 0.02 | QA | 490 | 262 | 31 | 90 | 276 | 51 | 16000 | 2.1 | 81 | 11 | 261 | 11 |
| 3 | 0.02 | QA | 498 | 263 | 32 | 90 | 277 | 57 | 15900 | 2.2 | 83 | 12 | 262 | 12 |
| 4 | 0.023 | QA | 497 | 264 | 33 | 80 | 278 | 58 | 15800 | 2.3 | 84 | 12.2 | 263 | 12.2 |
| 5 | 0.024 | QA | 496 | 265 | 34 | 80 | 277 | 59 | 15900 | 2.4 | 86 | 12.3 | 264 | 12.3 |
| 6 | 0.025 | QA | 495 | 266 | 35 | 70 | 278 | 60 | 16000 | 2.5 | 87 | 12.4 | 265 | 12.4 |
| 7 | 0.025 | QA | 496 | 267 | 36 | 70 | 278 | 61 | 16000 | 2.6 | 88 | 12.5 | 266 | 12.5 |
| 8 | 0.025 | QA | 496 | 267 | 36 | 70 | 278 | 61 | 17000 | 2.7 | 89 | 12.6 | 267 | 12.6 |
| 9 | 0.026 | QA | 497 | 268 | 38 | 60 | 279 | 62 | 18000 | 2.8 | 90 | 12.7 | 268 | 12.7 |
| 10 | 0.027 | QB | 498 | 269 | 39 | 60 | 278 | 64 | 19000 | 3 | 93 | 14 | 270 | 13 |
| 11 | 0.03 | QB | 497 | 260 | 40 | 60 | 277 | 63 | 20000 | 4 | 100 | 20 | 280 | 15 |
| 12 | 0.03 | QC | 497 | 265 | 42 | 50 | 277 | 70 | 26000 | 4 | 100 | 22 | 282 | 16 |
| 13 | 0.05 | QC | 450 | 270 | 50 | 50 | 280 | 90 | 30000 | 5 | 130 | 30 | 290 | 20 |
| 14 | 0.04 | QB | 460 | 263 | 47 | 50 | 278 | 85 | 28000 | 4 | 127 | 27 | 286 | 19 |
| 15 | 0.046 | QA | 490 | 269 | 48 | 55 | 279 | 87 | 29000 | 4.5 | 128 | 29 | 288 | 19 |
| 16 | 0.047 | QA | 460 | 267 | 48 | 45 | 279 | 83 | 27000 | 4.7 | 128 | 28 | 283 | 18 |
| 17 | 0.041 | QC | 490 | 268 | 48 | 40 | 278 | 85 | 29000 | 4.3 | 126 | 28 | 287 | 18.5 |
| 18 | 0.047 | QA | 480 | 265 | 47 | 40 | 279 | 85 | 28000 | 4.7 | 125 | 28 | 285 | 18 |
| 19 | 0.048 | QC | 446 | 267 | 49 | 42 | 278 | 87 | 29000 | 4.7 | 128 | 28 | 287 | 18 |
| 20 | 0.042 | QB | 460 | 265 | 47 | 42 | 278 | 85 | 28000 | 4.1 | 125 | 25 | 286 | 18.3 |
| 21 | 0.049 | QA | 490 | 268 | 46 | 38 | 275 | 85 | 28000 | 4.3 | 129 | 26 | 285 | 17 |
| 22 | 0.04 | QA | 470 | 268 | 45 | 35 | 279 | 83 | 29000 | 4.6 | 129 | 26 | 285 | 19 |
| 23 | 0.048 | QC | 495 | 265 | 45 | 30 | 275 | 85 | 28000 | 4.41 | 129 | 28.7 | 285 | 17.5 |
| 24 | 0.042 | QA | 485 | 268 | 46 | 35 | 275 | 89 | 29000 | 4.67 | 127 | 27 | 285 | 19 |
| 25 | 0.047 | QC | 495 | 265 | 49 | 35 | 278 | 88 | 29000 | 4.4 | 125 | 29 | 288 | 18 |
| 26 | 0.045 | QC | 495 | 265 | 45 | 30 | 278 | 85 | 28000 | 4.6 | 128 | 28 | 285 | 19 |
| 27 | 0.047 | QC | 495 | 265 | 49 | 30 | 278 | 88 | 29000 | 4.4 | 125 | 29 | 288 | 18 |
| 28 | 0.041 | QC | 490 | 268 | 49 | 98 | 277 | 84 | 29000 | 4.71 | 129 | 29 | 288 | 19 |

Example 29

Preparation Method and Dyeing Process of Modified Polyester Fiber:

Use modified polyester prepared in EXAMPLE 1 as the raw material of the modified polyester fiber. After measuring, squeezing out, cooling, oiling, stretching, heat-setting and winding, we can obtain modified polyester fibers.

The modified polyester fiber prepared above is dyed in a high temperature and high-pressure machine under the following conditions: before dying, treat the modified polyester fiber with a nonionic surfactant at 60° C. for 30 minutes, and then add to the dying solution. The content of disperse dye needed is 2.0% (o.w.f). The dispersant is NNO and its concentration is 1.2 g/L. The pH value is 5, the bath ratio is 1:50. Dye the polyester at 60° C., and raise the temperature gradually to 90° C., 100° C., 110° C., 120° C. and 130° C. for 1 hour's dyeing at these constant temperature.

Ordinary PET fibers use the same dyeing process as modified polyester fibers.

The percentage of dyeing of the modified polyester fiber after dyeing is obtained by the following method:

The percentage of dyeing is determined by the residual liquid colorimetric method. Take the appropriate amount of dyeing stock solution and dyeing residue, and add N, N-2 methylformamide (DMF) and distilled water. The ratio of DMF to water in the dye solution is 70/30 (v/v), the absorbance of the dye solution is measured by an ultraviolet-visible spectrophotometer, and the percentage of dyeing is calculated by the following formula.

$$\text{Percentage of dyeing} = 100\% \times \left(1 - \frac{A1}{A0}\right)$$

In the formula above. A0 and A1 are respectively the absorbances of the dyeing stock solution and the dye residue.

When the disperse dye is disperse red 3B, disperse blue SE-2R or disperse turquoise S-GL, the percentage of dyeing of modified polyester fiber is as follows:

TABLE 2 the percentage of dyeing of modified polyester fiber when use modified polyester prepared in EXAMPLE 1

| dye | | temperature | | | | |
|---|---|---|---|---|---|---|
| | | 90° C. | 100° C. | 110° C. | 120° C. | 130° C. |
| Disperse red 3B | Modified polyester fiber | 48.8 | 80.1 | 89.4 | 90.5 | 91.4 |
| | Ordinary fiber | 28.2 | 46.3 | 78.5 | 81.7 | 90.2 |
| Disperse blue SE-2R | Modified polyester fiber | 53.2 | 85.1 | 89.0 | 91.4 | 93.8 |
| | Ordinary fiber | 12.3 | 35.2 | 73.4 | 88.9 | 91.3 |
| Scattered turquoise blue S-GL | Modified polyester fiber | 44.1 | 68.1 | 78.5 | 82.7 | 86.2 |
| | Ordinary fiber | 11.8 | 36.3 | 70.9 | 75.6 | 82.6 |

By comparing the dyeing effect of the modified polyester fiber with the ordinary fiber, it can be seen that the dyeing effect of the modified polyester fiber is obviously superior to that of the ordinary fiber, and it can also be seen that the branched diol segment in the macromolecule of the modified polyester prepared in the invention, making the rate of increase much greater than the free volume unbranched general properties of the polyester of the macromolecular chains. The increase of the free volume helps fine particles go into the interior of the polyester, the free volume of the polyester fiber made from the modified polyester is much larger than that of the unbranched ordinary polyester fiber at the same temperature, which increases the diffusion degree of the dye and improves the dyeing property of the polyester fiber.

Example 30

Preparation Method and Dyeing Process of Modified Polyester Fiber:

Use modified polyester prepared in EXAMPLE 13 as the raw material of the modified polyester fiber. After measuring, squeezing out, cooling, oiling, stretching, heat-setting and winding, we can obtain modified polyester fibers.

The modified polyester fiber prepared above is dyed in a high temperature and high-pressure machine under the following conditions: before dying, treat the modified polyester fiber with a nonionic surfactant at 60° C. for 30 minutes, and then add to the dying solution. The content of disperse dye needed is 2.0% (o.w.f). The dispersant is NNO and its concentration is 1.2 g/L. The pH value is 5, the bath ratio is 1:50. Dye the polyester at 60° C., and raise the temperature gradually to 90° C., 100° C., 110° C., 120° C. and 130° C. for 1 hour's dyeing at these constant temperature.

Ordinary PET fibers use the same dyeing process as modified polyester fibers.

The percentage of dyeing of the modified polyester fiber after dyeing is obtained by the following method:

The percentage of dyeing is determined by the residual liquid colorimetric method. Take the appropriate amount of dyeing stock solution and dyeing residue, and add N, N-2 methylformamide (DMF) and distilled water. The ratio of DMF to water in the dye solution is 70/30 (v/v), the absorbance of the dye solution is measured by an ultraviolet-visible spectrophotometer, and the percentage of dyeing is calculated by the following formula.

$$\text{Percentage of dyeing} = 100\% \times \left(1 - \frac{A1}{A0}\right)$$

In the formula above, A0 and A1 are respectively the absorbances of the dyeing stock solution and the dye residue.

When the disperse dye is disperse red 3B, disperse blue SE-2R or disperse turquoise S-GL, the percentage of dyeing of modified polyester fiber is as follows:

TABLE 3 the percentage of dyeing of modified polyester fiber when use modified polyester prepared in EXAMPLE 13

| dye | | temperature | | | | |
|---|---|---|---|---|---|---|
| | | 90° C. | 100° C. | 110° C. | 120° C. | 130° C. |
| Disperse red 3B | Modified polyester fiber | 48.4 | 70.4 | 88.7 | 90.5 | 91.8 |
| | Ordinary fiber | 28.2 | 46.3 | 78.5 | 81.7 | 90.2 |

TABLE 3-continued the percentage of dyeing of modified polyester fiber when use modified polyester prepared in EXAMPLE 13

| dye | | 90° C. | 100° C. | 110° C. | 120° C. | 130° C. |
|---|---|---|---|---|---|---|
| Disperse blue SE-2R | Modified polyester fiber | 52.2 | 85.3 | 90.1 | 91.4 | 93.8 |
| | Ordinary fiber | 12.3 | 35.2 | 73.4 | 88.9 | 91.3 |
| Scattered turquoise blue S-GL | Modified polyester fiber | 48.5 | 74.9 | 84.6 | 86.1 | 88.1 |
| | Ordinary fiber | 11.8 | 36.3 | 70.9 | 75.6 | 82.6 |

By comparing the dyeing effect of the modified polyester fiber with the ordinary fiber, it can be seen that the dyeing effect of the modified polyester fiber is obviously superior to that of the ordinary fiber, and it can also be seen that the branched diol segment in the macromolecule of the modified polyester prepared in the invention, making the rate of increase much greater than the free volume unbranched general properties of the polyester of the macromolecular chains. The increase of the free volume helps fine particles go into the interior of the polyester, the free volume of the polyester fiber made from the modified polyester is much larger than that of the unbranched ordinary polyester fiber at the same temperature, which increases the diffusion degree of the dye and improves the dyeing property of the polyester fiber.

Example 31

Preparation Method and Dyeing Process of Modified Polyester Fiber:

Use modified polyester prepared in EXAMPLE 20 as the raw material of the modified polyester fiber. After measuring, squeezing out, cooling, oiling, stretching, heat-setting and winding, we can obtain modified polyester fibers.

The modified polyester fiber prepared above is dyed in a high temperature and high-pressure machine under the following conditions: before dying, treat the modified polyester fiber with a nonionic surfactant at 60° C. for 30 minutes, and then add to the dying solution. The content of disperse dye needed is 2.0% (o.w.f). The dispersant is NNO and its concentration is 1.2 g/L. The pH value is 5, the bath ratio is 1:50. Dye the polyester at 60° C., and raise the temperature gradually to 90° C., 100° C., 110° C., 120° C. and 130° C. for 1 hour's dyeing at these constant temperature.

Ordinary PET fibers use the same dyeing process as modified polyester fibers.

The percentage of dyeing of the modified polyester fiber after dyeing is obtained by the following method:

The percentage of dyeing is determined by the residual liquid colorimetric method. Take the appropriate amount of dyeing stock solution and dyeing residue, and add N, N-2 methylformamide (DMF) and distilled water. The ratio of DMF to water in the dye solution is 70/30 (v/v), the absorbance of the dye solution is measured by an ultraviolet-visible spectrophotometer, and the percentage of dyeing is calculated by the following formula.

$$\text{Percentage of dyeing} = 100\% \times \left(1 - \frac{A1}{A0}\right)$$

In the formula above, A0 and A1 are respectively the absorbances of the dyeing stock solution and the dye residue.

When the disperse dye is disperse red 3B, disperse blue SE-2R or disperse turquoise S-GL, the percentage of dyeing percentage of modified polyester fiber is as follows:

TABLE 3 the percentage of dyeing of modified polyester fiber when use modified polyester prepared in EXAMPLE 20

| dye | | 90° C. | 100° C. | 110° C. | 120° C. | 130° C. |
|---|---|---|---|---|---|---|
| Disperse red 3B | Modified polyester fiber | 48.8 | 81.2 | 88.2 | 90.3 | 91.4 |
| | Ordinary fiber | 28.2 | 46.3 | 78.5 | 81.7 | 90.2 |
| Disperse blue SE-2R | Modified polyester fiber | 56.5 | 84.1 | 89.1 | 91.4 | 93.8 |
| | Ordinary fiber | 12.3 | 35.2 | 73.4 | 88.9 | 91.3 |
| Scattered turquoise blue S-GL | Modified polyester fiber | 48.5 | 73.4 | 84.6 | 87.3 | 88.8 |
| | Ordinary fiber | 11.8 | 36.3 | 70.9 | 75.6 | 82.6 |

By comparing the dyeing effect of the modified polyester fiber with the ordinary fiber, it can be seen that the dyeing effect of the modified polyester fiber is obviously superior to that of the ordinary fiber, and it can also be seen that the branched diol segment in the macromolecule of the modified polyester prepared in the invention, making the rate of increase much greater than the free volume unbranched general properties of the polyester of the macromolecular chains. The increase of the free volume helps fine particles go into the interior of the polyester, the free volume of the polyester fiber made from the modified polyester is much larger than that of the unbranched ordinary polyester fiber at the same temperature, which increases the diffusion degree of the dye and improves the dyeing property of the polyester fiber.

What is claimed is:

1. A method for preparing a modified polyester, the method comprising the following steps:
   (1) preparation of terephthalic acid glycol ester:
   mixing terephthalic acid and branched diol to a first slurry, and carrying out a first esterification reaction under a catalytic action of concentrated sulfuric acid to obtain the terephthalic acid glycol ester;
   (2) preparation of ethylene terephthalate:
   mixing the terephthalic acid and ethylene glycol to a second slurry, carrying out a second-esterification reaction to obtain the ethylene terephthalate;
   (3) preparation of the modified polyester:
   after the second esterification reaction in the step (2) is completed, adding the terephthalic acid glycol ester prepared in the step (1), stirring and mixing, performing a polycondensation reaction under the action of the catalyst and the stabilizer, and under a condition of a negative pressure, first in a low vacuum stage and then in a high vacuum stage to obtain the modified polyester; wherein the modified polyester consists of a terephthalic acid segment, an ethylene glycol segment, and branched diol segment; the branched diol segment refers to a diol segment where a branch is located on one non-end group carbon in the diol segment and the branch is a linear carbon chain having 5 to 10 carbon atoms; a molar percentage of the branched diol segment and the ethylene glycol segment ranges from 2% to 5%; a spatial gap between internal molecular chains of the modified polyester increase by 10 to 30 v/v % at a temperature of 80 to 130° C.; at the temperature of 260-290° C., a melt viscosity decreases by 10%-20%.

2. The method for preparing the modified polyester according to claim 1, wherein, the first slurry in the step (1) is added to a first reactor for carrying out the first esterification reaction; the first esterification reaction is carried out under a pressurized nitrogen environment, and the pressure is in a range of normal pressure to 0.3 MPa, and a temperature is 180-240° C.; the first esterification reaction ends when a water distillation amount in the first esterification reaction reaches at least 90% of a first theoretical value; then the terephthalic acid glycol ester is obtained;
   the second slurry in the step (2) is added into a second reactor for carrying out the second esterification reaction; the second esterification reaction is carried out under a pressurized nitrogen environment, and the pressure is in a range of normal pressure to 0.3 MPa, and a temperature is 250-260° C.; the second esterification reaction ends when a water distillation amount in the second esterification reaction reaches at least 90% of a second theoretical value; then the ethylene terephthalate is obtained;
   in step (3) the stir and mix is performed for 15-20 minutes under the action of the catalyst and the stabilizer, and the negative pressure; in the polycondensation reaction under the condition of the low-vacuum stage, the pressure is smoothly pumped from the normal pressure to an absolute pressure under 500 Pa, a temperature is controlled at 260-270° C., and a reaction time is 30-50 minutes; then turn to the high vacuum stage, the polycondensation reaction continues and the reaction pressure is reduced to an absolute pressure of less than 100 Pa, and the reaction temperature is controlled at 275 to 280° C. and the reaction time is 50 to 90 minutes in order to obtain the modified polyester.

3. The method for preparing the modified polyester according to claim 1, wherein, in step (1), a molar ratio of the terephthalic acid to the branched diol is 1:1.3-1.5; the concentrated sulfuric acid is added in an amount of 0.3-0.5% by weight of the terephthalic acid, and a-concentration of the concentrated sulfuric acid is 50-60% wt.

4. The method for preparing the modified polyester according to claim 1, wherein in step (2), a molar ratio of the terephthalic acid to the ethylene glycol is 1:1.2 to 2.0.

5. The method for preparing the modified polyester according to claim 1, wherein in step (3), a molar percentage value of the terephthalic acid glycol ester and the ethylene terephthalate is 2 to 5%; the catalyst is antimony trioxide, ethylene glycol or cerium acetate, and an amount of the catalyst is 0.01% to 0.05% of a total weight of the terephthalic acid; the stabilizer is triphenyl phosphate, trimethyl phosphate or trimethyl phosphite, and an amount of the stabilizer is 0.01% to 0.05% of the total weight of the terephthalic acid.

6. The method for preparing the modified polyester according to claim 1, wherein the branched diol segment is one or more items selected from the group consisting of a 2-pentyl-1,3 propanediol segment, a 2-hexyl-1,3 propanediol segment, a 2-heptyl-1,3 propanediol segment, a 2-octyl-1,3 propanediol segment, a 2-mercapto-1,3 propanediol segment, a 2-mercapto group-1,3 propanediol segment, a 2-pentyl-1,4 butanediol segment, a 2-hexyl-1,4 butanediol segment, a 2-heptyl-1,4 butanediol segment, a 2-octyl-1,4 butanediol segment, a 2-mercapto-1,4 butanediol segment, a 2-mercapto-1,4 butanediol segment, a 2-pentyl-1,5 pentanediol segment, a 2-hexyl-1,5-pentanediol segment, a 2-heptyl-1,5-pentanediol segment, a 2-octyl-1,5-pentanediol segment, a 2-mercapto group-1,5 pentanediol glycol segment, a 2-mercapto-1,5 pentanediol segment, a 2-pentyl-1,6 hexanediol segment, a 2-hexyl-1,6 hexanediol segment, a 2-heptyl-1,6-hexanediol segment, a 2-octyl-1,6-hexanediol segment, a 2-mercapto-1,6-hexanediol segment and a 2-mercapto-1,6 hexanediol segment.

7. The method for preparing the modified polyester according to claim 1, wherein the branched diol is one or more items selected from the group consisting of a 2-pentyl-1,3 propanediol, a 2-hexyl-1,3 propanediol, a 2-heptyl-1,3 propanediol, a 2-octyl-1,3 propanediol, a 2-mercapto-1,3 propanediol, a 2-mercapto group-1,3 propanediol, a 2-pentyl-1,4 butanediol, a 2-hexyl-1,4 butanediol, a 2-heptyl-1,4 butanediol, a 2-octyl-1,4 butanediol, a 2-mercapto-1,4 butanediol, a 2-mercapto-1,4 butanediol, 2-pentyl-1,5 pentanediol, a 2-hexyl-1,5-pentanediol, a 2-heptyl-1,5-pentanediol, a 2-octyl-1,5-pentanediol, a 2-mercapto group-1,5 pentanediol glycol, a 2-mercapto-1,5 pentanediol, a 2-pentyl-1,6 hexanediol segment, a 2-hexyl-1,6 hexanediol, a 2-heptyl-1,6-hexanediol, a 2-octyl-1,6-hexanediol, a 2-mercapto-1,6-hexanediol and a 2-mercapto-1,6 hexanediol.

8. The method for preparing the modified polyester according to claim 1, wherein the modified polyester has a number-average molecular weight ranging from 15,000 to 30,000.

9. The method for preparing the modified polyester according to claim 2, wherein, in step (1), a molar ratio of the terephthalic acid to the branched diol is 1:1.3-1.5; the concentrated sulfuric acid is added in an amount of 03-0.5% by weight of the terephthalic acid, and a-concentration of the concentrated sulfuric acid is 50-60% wt.

10. The method for preparing the modified polyester according to claim 2, wherein in step (2), a molar ratio of the terephthalic acid to the ethylene glycol is 1:1.2 to 2.0.

11. The method for preparing the modified polyester according to claim 2, wherein in step (3), a molar percentage value of the terephthalic acid glycol ester and the ethylene terephthalate is 2 to 5%; the catalyst is antimony trioxide, ethylene glycol or cerium acetate, and an amount of the catalyst is 0.01% to 0.05% of a total weight of the terephthalic acid; the stabilizer is triphenyl phosphate, trimethyl phosphate or trimethyl phosphite, and an amount of the stabilizer is 0.01% to 0.05% of the total weight of the terephthalic acid.

12. The method for preparing the modified polyester according to claim 2, wherein the branched diol segment is one or more items selected from the group consisting of a 2-pentyl-1,3 propanediol segment, a 2-hexyl-1,3 propanediol segment, a 2-heptyl-1,3 propanediol segment, a 2-octyl-1,3 propanediol segment, a 2-mercapto-1,3 propanediol segment, a 2-mercapto group-1,3 propanediol segment, a 2-pentyl-1,4 butanediol segment, a 2-hexyl-1,4 butanediol segment, a 2-heptyl-1,4 butanediol segment, a 2-octyl-1,4 butanediol segment, a 2-mercapto-1,4 butanediol segment, a 2-mercapto-1,4 butanediol segment, a 2-pentyl-1,5 pentanediol segment, a 2-hexyl-1,5-pentanediol segment, a 2-heptyl-1,5-pentanediol segment, a 2-octyl-1,5-pentanediol segment, a 2-mercapto group-1,5 pentanediol glycol segment, a 2-mercapto-1,5 pentanediol segment, a 2-pentyl-1,6 hexanediol segment, a 2-hexyl-1,6 hexanediol segment, a 2-heptyl-1,6-hexanediol segment, a 2-octyl-1,6-hexanediol segment, a 2-mercapto-1,6-hexanediol segment and a 2-mercapto-1,6 hexanediol segment.

* * * * *